United States Patent [19]
Robinson

[11] 3,777,414
[45] Dec. 11, 1973

[54] WATER COLOR SET AND TEACHING AID

[75] Inventor: Edgar A. Robinson, Orchard Lake, Mich.

[73] Assignee: Palmer Paint Products, Inc., Troy, Mich.

[22] Filed: Mar. 1, 1972

[21] Appl. No.: 230,655

[52] U.S. Cl. .................................. 35/28.5, 206/1.8
[51] Int. Cl. ............................................ G09b 11/10
[58] Field of Search...................... 35/28.3, 28.5, 44, 35/39; 206/1.7, 1.8; 273/142 A, 142 H, 142 HA, 141 R

[56] References Cited
UNITED STATES PATENTS

| | | | |
|---|---|---|---|
| 1,391,028 | 9/1921 | Werntz................................ 206/1.8 |
| 1,483,529 | 2/1924 | Tanner................................. 35/28.3 |
| 2,107,239 | 2/1938 | Eckhoff ............................... 206/1.8 |
| 2,171,675 | 9/1939 | Travnitscher.................... 206/1.8 X |
| 3,089,584 | 5/1063 | King..................................... 206/1.8 |

Primary Examiner—Harland S. Skogquist
Attorney—Charles R. Rutherford

[57] ABSTRACT

A circular semi-rigid plastic base is molded to provide a horizontal, cylindrically bottom-flanged panel having an annular series of equally spaced circular, hollow well cavities or indentations, each removably receiving a shallow-walled, telescopingly mated plastic pigment-containing pot. The pots are side-flanged for ready manual grasping in their removal from and replacement in the respective indentations. A snap-on type cover of a clear, semi-rigid plastic has a top circular panel and a cylindrical depending flange nesting over the flange of the base; and the cover is thus flange-guided for manual rotation upon the base. This permits a user to effect optional angularly adjusted relationships of certain opaque reference and selector indicia, as inscribed on the transparent cover panel, to color pots viewed in juxtaposition beneath a cover panel indicium. Radial indents on the cover and base flanges facilitate separation of the cover from the base, and the base from a bottom finishing and rigidifying disc of cardboard.

3 Claims, 6 Drawing Figures

PATENTED DEC 11 1973 3,777,414

WATER COLOR SET AND TEACHING AID

BACKGROUND OF THE INVENTION - FIELD

The invention will find usual application in the instruction of inexperienced painters in oils, water color, and the like, also in the assistance of more experienced artists in a selection and putting into execution of balanced combinations of colors, in particular, chromatic schemes arrived at by reference to a known color wheel and selector pattern. Conceivably, also, the invention contemplates a device of a very similar structural nature, but simply substituting for the color pot concept corresponding chromatic representations of primary and blended spectral colors, that may serve as a slide rule-type aid for viewers of an artistic work in analyzing its composition, as in respect to color harmony, contrast, intensity, etc.

I am unaware of any existing prior art dealing with a teaching aid color set involving the mechanically interrelated structural features set forth in the Abstract and hereinafter described in detail.

SUMMARY OF THE INVENTION

The color set of the invention is a means enabling its user readily to practice a known color wheel selection principle; that is, it is a physical agency for the teaching of novices and the further expertizing of other persons in the selection, combination and/or balancing of primary colors and hues of the spectrum for a most effective and artistic organization in a painting. Thus, a base component of the set is essentially simulative of a color wheel in its mounting, in a circumferentially spaced circular array of a number of individual shallow pots, each containing one of such colored and variously hued spectral pigments. These have progression in an annular series of twelve, in the same variations of coloration as the spectrum, i.e., the usual stages including red, yellow and blue, and intermediate secondary and blended colors. Further, like pots for black and white are disposed in the infield outlined by the circular pot series of the base panel; and that panel also affords depressions for a palette mixing of selected colors when desired.

Essentially, in accordance with the involved color wheel principle, the spacing of the progressive colors and hues of the array is such that each pair thereof which are diametrically opposite one another on the wheel pattern are complementary in the spectral sense; and the layout of adjacent touching or non-adjacent pigments colors is also predetermined for an optimum usefulness of the device, as will appear.

To this end, the top circular panel of the transparent cover or lid of the set, as telescoped on and circumferentially adjustable relative to the base, has selector patterns or indicia inscribed thereon which are diagramatic of known sorts of color schemes. These will ordinarily be the so-called "Complementary " (mentioned above), "Triadic," "Analogous," and Split Complementary" schemes, all as hereinafter further detailed, with each of said indicium patterns specially and differently relates to a common center or axis of relative rotation of the cover and base of the device. Thus, once certain colors, tints, shades or hues have been mentally selected by the artist as those with which he will concern himself, he will be importantly instructed and assisted in portraying balanced and effective color relationships in the subjected depicted.

More directly in regard to structural aspects of the invention and the manner in which these features function, the base panel of the set is preferably molded of a thin opaque, semi-rigid plastic to provide a desired circular array of circular pot receiving recesses or depressions of limited depth on a circular top panel of the base, in the uniformly spaced circumferential order mentioned above. Each of these removably receives a pigment or paint pot in the form of a plastic piece molded to provide a shallow pigment-receiving cavity, which is defined by a circular wall mating downwardly into a molded depression of the base. Each such pot member by preference also presents outwardly flanged ear elements or tabs for grasping by the user in removing the pot for cleaning and refilling, replacement or substitution.

Further, the transparent cover is molded to provide an integral cylindrical flange to frictionally nest snugly downwardly over a corresponding circumferential side flange of the base, with annular bead and groove formations on these flanges affording a releasably mated, snap-on retention of the cover against accidental separation from the base. Yet the cover is readily adjustable rotatively on the base, as guided by said formatioms, for the desired selection of pigment colors under the guidance of the optional indicium patterns inscribed on the cover panel. By preference, finger nail depressions are formed on the base flange to facilitate an intended removal therefrom of the cover, as desired; and that flange also has circumferentially spaced radially inward formations to retain a bottom closure disc within the lateral confine of the flange. This disc, by preference, will present an attractive external colored representation and explanation of the mode of use of the set.

DESCRIPTION OF A PREFERRED EMBODIMENT

Figure 4:
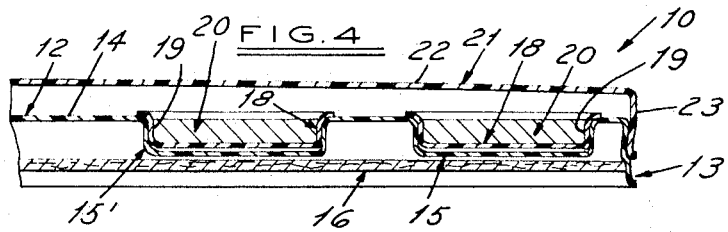
FIG. 4 is a fragmentary enlarged scale view in radial cross-section on line 4—4 of FIG. 1, illustrating the telescoped and relatively rotatable engagement of annular flanges of the cover and base, also showing the telescoped mounting of certain pigment pots in molded indentations of the base top panel.

Referring first to FIG. 4 of the drawings as best showing structural details in the over-all composition of the color set of the invention, generally designated by the reference numeral 10, it comprises a generally flat, circular base 12, provided with an integrally depending, circumferentially continuous cylindrical flange 13 of special sectional contour to be described, this flange bounding a flat circular top panel 14 of base 12. The latter is molded of an opaque, relatively thin and flexible plastic composition, though self-sustaining as to shape, to afford, in addition to flange 13 and panel 14, a number of circular, relatively shallow depressions or indentations 15 in said panel. These have co-planar peat bottoms lying just above a circular closure disc 16 of cardboard or other relatively rigid inexpensive material, which is frictionally fitted within and retained in place by base flange 13. Disc 16 may be provided on its lower exposed surface with attractively laid out descriptive and illustrative matter of an instructive or educational nature pertaining to the color wheel concept underlying the operation of set 10.

The indentations or recess formations 15 of base 12, as arranged in an equally spaced annular series or array, and otherwise (in a manner to be described), each matingly receive from above a shallow molded plastic pigment or color pot 18 defined by a cylindrical wall 19, this wall having a snug but readily releasable nested reception in the corresponding wall of a base panel indentation 15. Pots 18 contain pigments in the various primary, secondary and blended colors of the spectrum, typically in the form of preformed water soluble disc charges 20, although oils and other type pigments or paints are contemplated.

Finally, set 10, as considered in general, is completed by a generally flat lid or cover 21 molded of a transparent, relatively thin and flexible, though self-sustaining, plastic composition. It includes a clear flat and circular top panel 22, which is continuously bounded by an integral circumferential flange 23.

Figure 1:
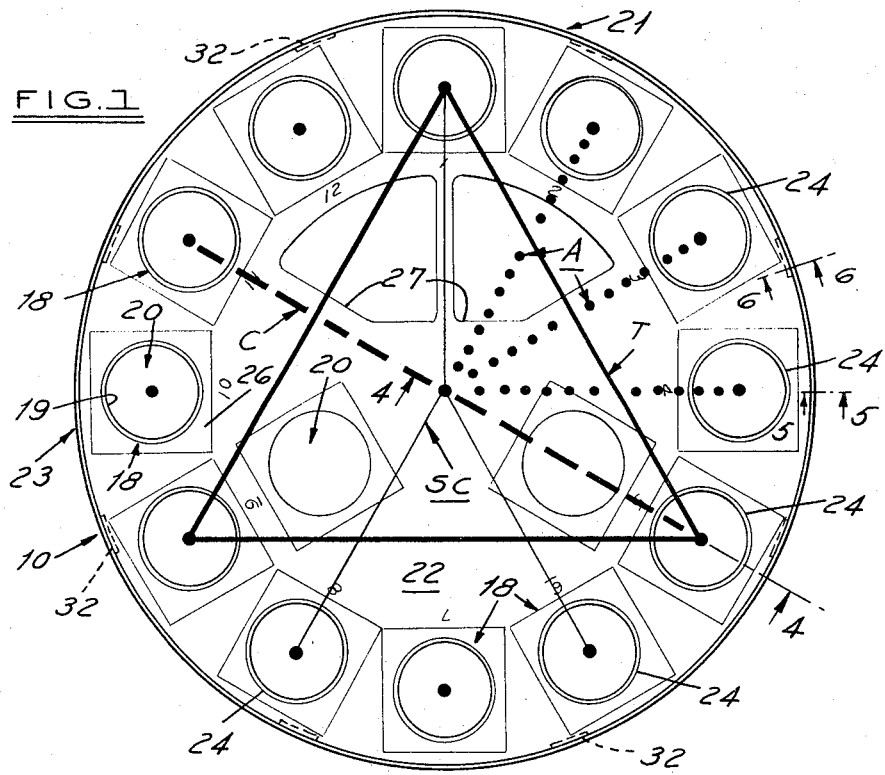
FIG. 1 is a top plan view of the assembled set showing an operational relationship of four diagrammatic selector indicia or patterns printed on the cover top panel to numbered pot components of the base.
Figure 2:
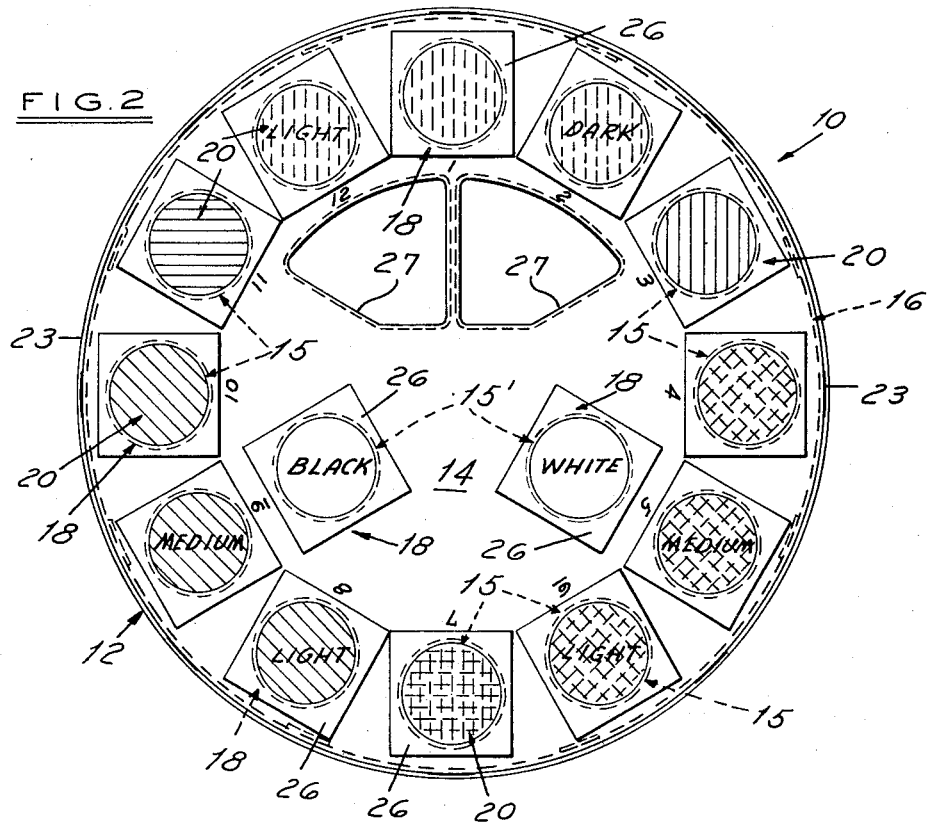
FIG. 2 is a top plan view of the base, showing pigment pot and other features thereof with the cover removed.
Figure 3:
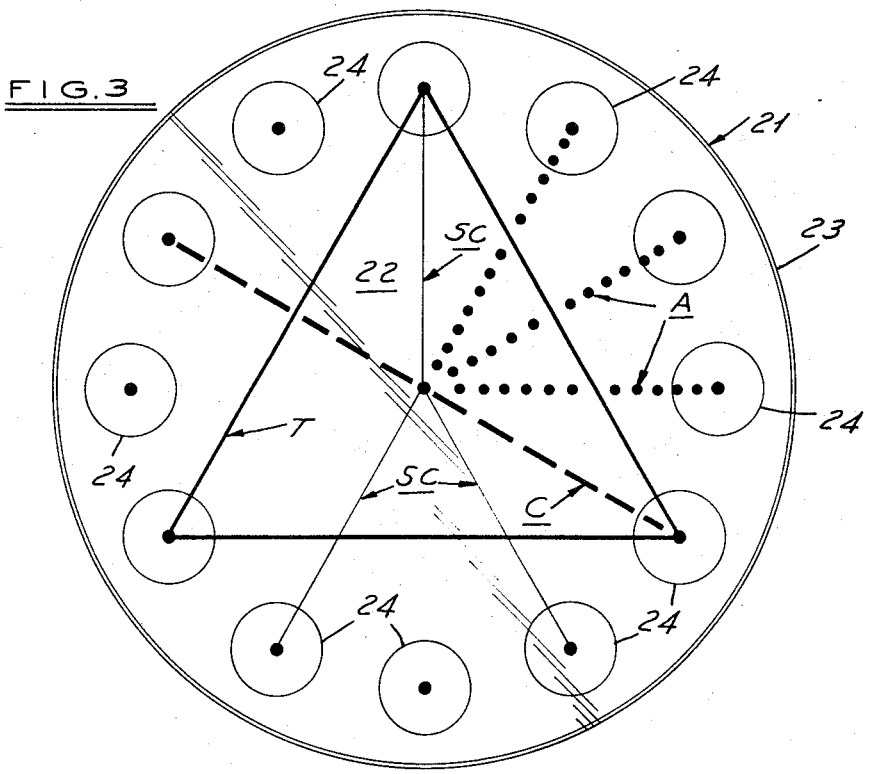
FIG. 3 is a similar top plan view of the cover alone, showing the relationship of the selector patterns inscribed thereon to a series of circular reference indicia spaced in the manner of the pot indentations of the base.

Now referring to FIGS. 1 and 3, the cover 21 is inscribed in black on its top panel 22 with the several patterns of color scheme indicia mentioned in the Summary and characteristic of the color wheel concept followed in the use of set 10. Typically, one such indicium is a straight, boldly dashed pointer extending diametrically of cover panel 22 between the centers of two out of twelve circular reference indicia 24, which are inscribed in lighter lining adjacent and about the margin of cover panel 22. A circumferential series of said reference markings 24 corresponds in number and spacing to the arrangement of base panel indentations 15 and color pots 18 therein, as is evident from a comparison of FIGS. 1, 2 and 3. The heavy diametral dashed line, as designated C, thus represents a pointer indicium, distinctively lined in contrast with other indicia linings to be described, for setting up a "Complementary" color scheme, extending as it will between two colors of the spectrum which find themselves diametrically opposite one another im the circular wheel-type arrangement.

A second distinctively and differently lined indicium inscribed on cover panel 22 is in the form of a continuously black lined equilateral triangle whose apices coincide with centers of three other equally spaced circular reference indicia 24. This triangle represents a so-called "Triadic" indicator layout, hence is generally designated by the reference numeral T.

A third and further different indicator has the form of three equal length radial indicia each depicted by a line of dots and extending from the axial center of circular panel 22 to centers of three still further reference indicia 24 which immediately adjoin one another in the circumferential sense. Since colors located by reference to said three indicia 24 will lie directly beside one another in the spectral array, the dotted indicia represent what is termed and "Analogous" color scheme, which is therefore designated A as a whole.

The fourth inscription on the top panel 22 is generally Y-shaped, being represented by three lightly lined radial components; these respectively extend, in one pair, from the center of panel 22 to the centers of two circular locating indicia 24 which are not directly adjacent one another, i.e., are spaced by an intervening marking 24, but diametrically balance a third radial component extending in an opposite radial direction from panel center to center of a final indicium 24. This type of pattern of indicia is "Split Complementary," hence designated in general by the expression SC.

Next referring to FIGS. 1 and 2, which show the base 12 and its associated components as viewed from above, it is seen that the molded indentations 15 therein, and pots 18 occupying them, are in an equally spaced circular series exactly the same as the arrangement of circular reference marks or insignia 24 on cover panel 22. Top panel 14 of base 12 is shown in FIGS. 1 and 2 as having printed thereon identifying numbers for the various primary colors, secondaries and blends in light, medium and dark shades of the spectrum represented by pigment 20 contained therein. Such colors as are herein involved are denoted in clockwise order from "1" to "12". The arrangement and/or placement of colors may be altered as desired, but preferably will be within the intent of the general sort of color wheel layout previously set forth. Base panel 14 is also equipped with circular depressions, specially designated 15', which lie in a field outlined by the circular series. These removably and replaceably receive "black" and "white" pigment pots.

It is seen from FIGS. 1 and 2 that each of the pots 15 and 15' is molded at its top to provide an integral, laterally outwardly extending rectangular flange or flap formation 26 at which the pot may be lifted from its recess or indentation on base 12. Similarly, panel 14 of said base is preferably molded to provide flat bottomed cavities 27 for the palette-mixing of plural sigments, or the solution of a selected one thereof.

Figures 5, 6:
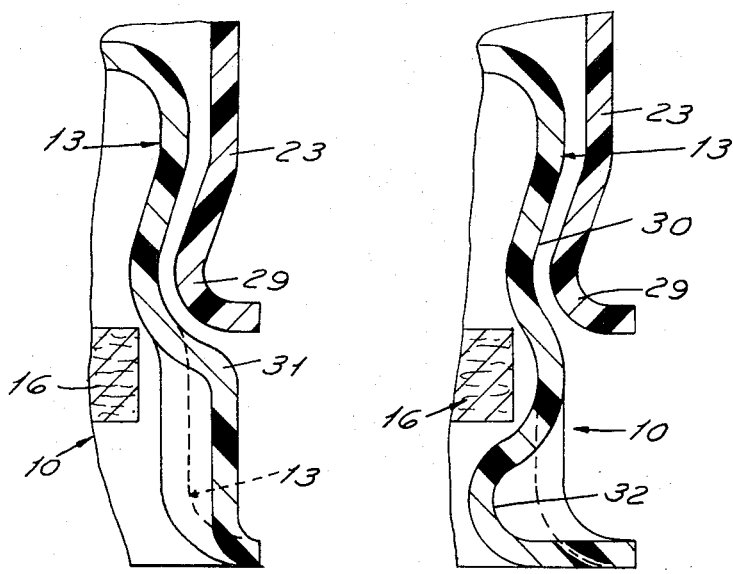
FIGS. 5 and 6 are still more enlarged fragmentary views in vertical cross-section at lines 5—5 and 6—6, respectively, in FIG. 1.

Now referring specifically to FIGS. 5 and 6, the continuous cylindrical flange 23 of cover 21 terminates at its bottom in an inwardly shaped, arcuately re-entrant circumferential lip 29; and the flange 13 of base 12 is shaped to a circumferentially continuous annular groove at 30, into which cover lip 29 snaps upon displacement of cover 21 downwardly in fully telescoped relation atop base 12.

Furthermore, as depicted in FIG. 6, base flange 13 is molded to provide a series of circumferentially spaced, radially outwardly extending shoulders 31 upon which cover flange lip 29 may bottom, as well as with a plurality of circumferentially intervening, radially inwardly extending re-entrant formations at 32 (FIG. 6). These are for a dual purpose; they afford access for a user's fingernail in separating the cover and base, and they also serve as stops releasably retaining base closure disc 16 in place within the confine of base flange 13.

What is claimed is:

1. A color pigment paint teaching set comprising a base providing a mount for a circular planar array of equi-angularly spaced flat-bottomed recesses, said recesses removably receiving pots containing pigments of progressively differing color, a cover providing a transparent panel portion mounted for rotative adjustment above and relative to said base in a plane paralleling that of said pots, the base and cover having mating cylindrical flange surfaces and snap-on mating groove and bead formations on said surfaces at which their relative rotation is guided and separation thereof is yieldably restrained, said cover panel portion being light transmissive and provided with sets of distinctively and differently lined visible selector indicia viewable from above in juxtaposition relative to the differently colored pigments of said pots.

2. The set of claim 1, in which at least one of said cylindrical flange surfaces has a formation to assist in separation of the cover and base from one another.

3. The set of claim 1, in which said base bottoms in relation to a closure disc restrained within the flange surface of the base.

* * * * *